United States Patent Office 3,221,004
Patented Nov. 30, 1965

3,221,004
COBALT COMPLEX MONOAZO DYESTUFFS
Reinhard Neier, Basel, Switzerland, assignor to
Sandoz Ltd., Basel, Switzerland
No Drawing. Filed Apr. 1, 1963, Ser. No. 269,708
Claims priority, application Switzerland, Apr. 12, 1962,
4,467/62
6 Claims. (Cl. 260—151)

This invention relates to monoazo dyes and their metal complex compounds which in the metal free form correspond to the formula

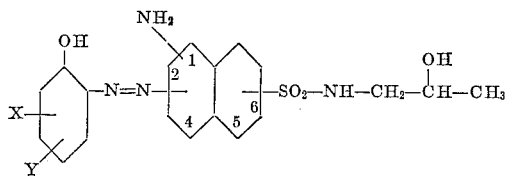

(I)

wherein X and Y represent hydrogen, halogen, alkyl or alkoxy, and the $NH_2$ group stands in the adjacent position to the —N=N— group.

These new dyes (I) can conveniently be prepared by coupling 1 mole of the diazo compound of an amine of the formula

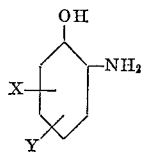

(II)

with 1 mole of a compound of the formula

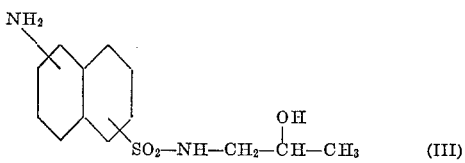

(III)

in the position adjacent to the $NH_2$ group.

The coupling reaction of the diazotized amino compound of Formula II with a compound of Formula III is performed advantageously in acid aqueous medium.

The new azo dyes may be metallized either in substance or on the fiber, cobalt being the preferred metal. They can be treated with a cobalt-yielding agent in such a manner that a cobalt-containing azo dye is formed which contains essentially one cobalt atom in complex combination with two molecules of the azo compound residue. For the production of these 1:2 cobalt complex compounds it is preferable to allow an amount of a cobalt-yielding agent containing less than two but at least one atom of cobalt to act upon two molecules of the azo compound.

The metallizing reaction yielding cobalt complexes is carried out most advantageously in an alkaline aqueous or organic medium, to which the cobalt compound is added in the presence of compounds which maintain the cobalt dissolved in complex combination in caustic-alkaline medium, e.g., tartaric, citric or lactic acid.

Examples of suitable cobalt compounds are cobaltous formate, cobaltous acetate and cobaltous sulfate. The resulting cobalt complex compounds are precipitated from the aqueous medium by the addition of salt, filtered, washed if necessary, and dried.

On metallization of a mixture of one or more monoazo dyes of Formula I according to the invention with other metallizable azo dyes, valuable metal complex dyes, preferably heterogeneous cobalt complex dyes are obtained, the shade and dyeing properties of which can be modified to suit a particular use by changing the mixture of azo compounds.

The mixing ratio of the dyes of Formula I with any other metallizable azo dye can be varied within wide limits. In most cases equimolar amounts of the two dyes are metallized, though it is also possible to employ mixtures containing 20–80 mol-percent of one or the other starting dye.

The azo dyes obtained are suitable for the dyeing of natural and synthetic polyamide fibers, wool, silk, and leather in blue, grey and green shades. On aftertreatment with suitable cobalt compounds in the same or a fresh bath, the dyeings are fast to light and wet treatments, e.g., fastness to washing, water, sea water, perspiration, carbonizing, bleaching, milling, rubbing, pressing, acids, alkalis, stoving and cross-dyeing.

The homogeneous or heterogeneous cobalt-containing azo dyes produced in substance are readily soluble in water and dye wool, silk, leather and polyamide fibers from neutral or weakly acid dyebaths in grey, blue and green shades having good light fastness and good wet fastness properties, e.g., fastness to washing, water, sea water, perspiration, carbonizing, bleaching, milling, rubbing, pressing, acids, alkalis, stoving and cross-dyeing. The slight sensitivity to hard water and good suitability for high-temperature dyeing are other notable features of these dyes.

The homogeneous or heterogeneous cobalt-containing azo dyes produced in substance are also well soluble in polar solvents such as alcohols, ketones and carboxylic acid esters, e.g. glycols, glycol ethers, ethanol, acetone, acetic acid ethyl ester, propionic acid ethyl ester, amylacetate, etc. These solubility properties make them suitable for the dyeing and printing of leather, the mass coloration of artificial fibers in solution in organic solvents, and the coloration of plastics and paint and lacquer media. In these materials they yield grey, blue and green shades of very good light fastness and good wet fastness properties.

In the following examples the parts and percentages are by weight and the temperatures in degrees centigrade.

*Example 1*

21.7 parts of the monoazo dye produced by coupling diazotized 2-amino-1-hydroxy-4-chlorobenzene with 2-aminonaphthalene - 6 - sulfonic acid - (2' - hydroxy)-propyl amide in acid medium are dissolved in 500 parts of water with 10 parts of sodium hydroxide. At 60° a solution of 7.1 parts of crystallized cobaltous sulfate and 1.9 parts of tartaric acid in 80 parts of water is added. The reaction solution is then stirred at 70° until no further metal-free starting dye is indicated. The cobalt-containing dye thus formed is precipitated with sodium chloride, filtered off, dried and ground. It is a dark powder which dissolves in water to give reddish blue solutions. It dyes wool, silk, leather and polyamide fibers in navy blue shades. Owing to its good solubility in organic solvents it is suitable for the coloration of fiber-forming materials in solution, e.g., cellulose secondary acetate and polyacrylonitrile, and of plastics and lacquers e.g. vinyl and nitrocellulose lacquers, in navy blue shades.

*Dyeing Example A*

3 parts of the dye obtained according to Example 1 are dissolved in 100 parts of hot water and the solution diluted to 4000 parts with water at 40–50°. In this solution 100 parts of previously wetted-out wool are entered. After the dropwise addition of 2 parts of acetic acid the dyebath is heated to 100° over 30 minutes. It is held at this temperature for a further hour, after which the dyed wool is removed, rinsed with water and dried. A navy blue dyeing having excellent fastness to light, washing, milling and perspiration is obtained.

Further starting materials for the production of homogeneous monoazo dyes and cobalt-containing azo dyes according to the particulars of Example 1 are set forth in Table 1. In column (I) of the table the diazo component is listed, in column (II) the coupling component, and in column (III) the shade of the dyeing of the cobalt-containing dye on wool.

ple 1, 0.4 part of ammonium sulfate and 0.1 part of cobaltous sulfate. At 40°, 10 parts of previously wetted-out wool are entered in the bath. It is heated to 100° in 20 minutes and held at this temperature for 1 hour. During this time 2 parts of 10% acetic acid are dropped into the bath and the water lost by evaporation is replaced from time to time. On removal from the bath the wool is rinsed and dried. It is dyed to a navy blue shade.

Nylon and other polyamide fibers are dyed with this dye in exactly the same way as wool. Silk also is dyed on the same lines, except that the temperature of the dyebath is kept at 90° during dyeing. Leather and paper are dyed by the methods normally used in practice. Formulae of representative dyes of the foregoing examples are as follows:

*Example I*

The 1:2 cobalt complex compound of the monoaza dye of the formula

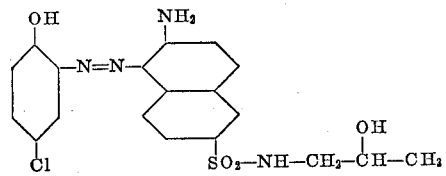

TABLE 1

| Example No. | Diazo Component (I) | Azo Component (II) | Shade of Cobalt Complex Compound on Wool (III) |
|---|---|---|---|
| 2 | 2-amino-1-hydroxy-4-chlorobenzene | 2-aminonaphthalene-5-sulfonic acid-(2'-hydroxy)-propylamide | Grey. |
| 3 | do | 1-aminonaphthalene-5-sulfonic acid-(2'-hydroxy)-propylamide | Olive-grey. |
| 4 | do | 1-aminonaphthalene-4-sulfonic acid-(2'-hydroxy)-propylamide | Violet-blue. |
| 5 | 2-amino,1-hydroxy-4,6-dichlorobenzene | 2-aminonaphthalene-6-sulfonic acid-(2'-hydroxy)-propylamide | Greenish blue. |
| 6 | 2-amino-1-hydroxy-4-chloro-6-methylbenzene | do | Blue. |
| 7 | 2-amino-1-hydroxy-4-methoxybenzene | do | Do. |
| 8 | 2-amino-1-hydroxy-4-bromobenzene | do | Do. |
| 9 | 2-amino-1-hydroxybenzene | 2-aminonaphthalene-6-sulfonicacid-(2'-hydroxy)-propylamide | Blue-grey. |
| 10 | 2-amino-1-hydroxy-4-tert. butylbenzene | do | Blue. |
| 11 | 2-amino-1-hydroxy-4-tert. amylbenzene | 2-aminonaphthalene-5-sulfonic acid-(2'-hydroxy)-propylamide | Grey. |

*Dyeing Example B*

100 parts of secondary cellulose acetate with a content of 54–55% splittable acetic acid are dissolved in 300 parts of a suitable solvent, e.g., a mixture of 275 parts of acetone and 25 parts of methanol, and allowed to swell overnight.

2 parts of the cobalt-containing dye obtained according to the procedure of Example 1 are dissolved in 60 parts of the same solvent. This solution is added to the cellulose acetate dope and the whole stirred until 60 parts of solvent have evaporated. It is then filtered through cotton and a filter press. The further stages of the process to the formation of the filament are the same as in the production of uncolored acetate filaments. The filament is dyed to a deep navy-blue shade which has good light and wet fastness properties.

*Dyeing Example C*

A lacquer solution is prepared with 20 parts of the vinyl chloride-vinyl acetate copolymer composition "Vinylite VMCH," 70 parts of methylethyl ketone and 10 parts of ethylene glycol. 0.5 part of the cobalt-containing dye obtained according to Example 1 are stirred into 10 parts of the identical lacquer solution and this solution diluted with 25 parts of a 1:1 mixture of methylethyl ketone and cyclohexanone. The two solutions are intimately blended, applied to aluminium sheet and the coating air dried. It is of blue color and has good light fastness.

*Dyeing Example D*

A dyebath is prepared with 1000 parts of water, 0.2 part of the metal-free dye produced according to Examin the metal complex form

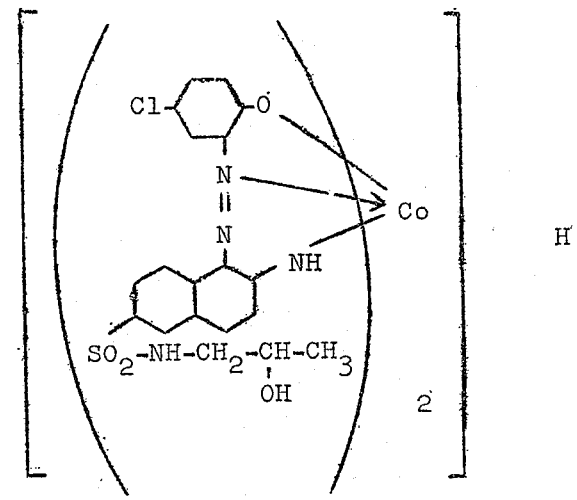

*Example II*

The 1:2 cobalt complex compound of the monoaza dye of the formula

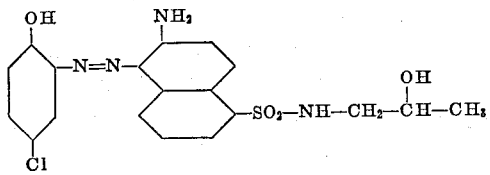

in the metal complex form
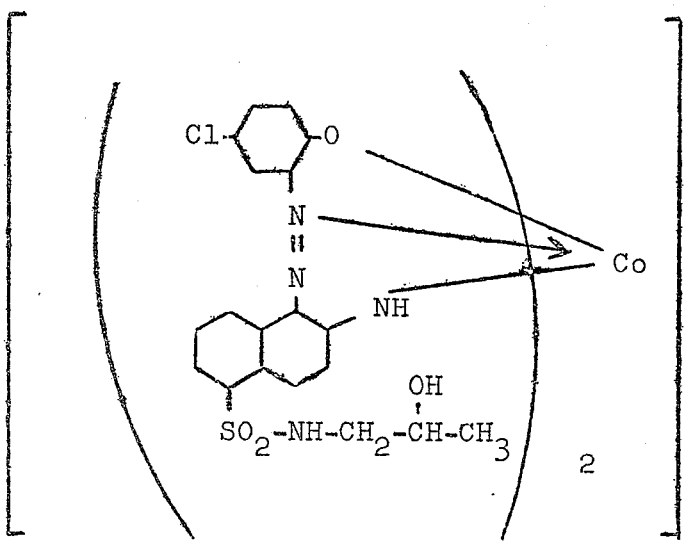
Example III
The 1:2 cobalt complex compound of the monoazo dye of the formula
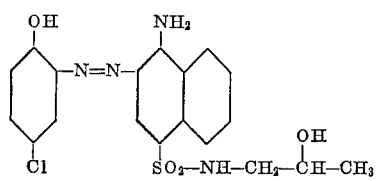
in the metal complex form
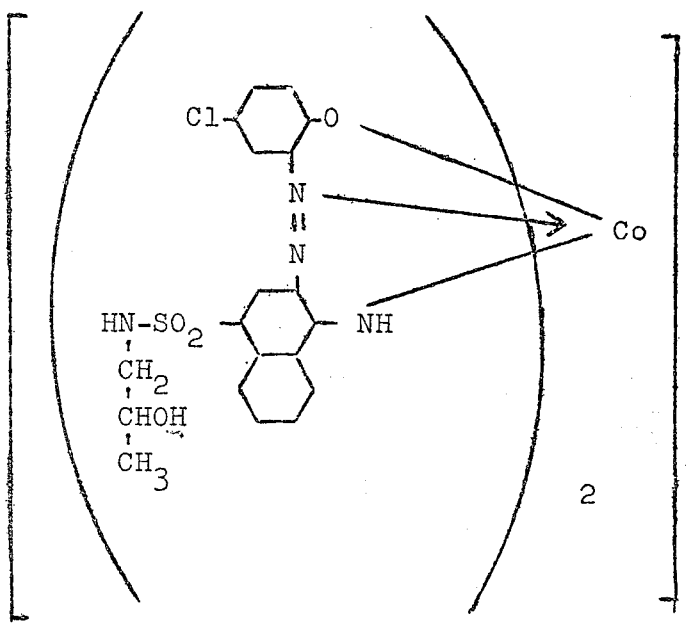
Example IV
The 1:2 cobalt complex compound of the monoazo dye of the formula
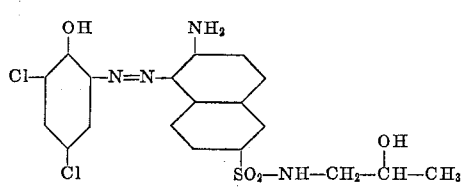

in the metal complex form

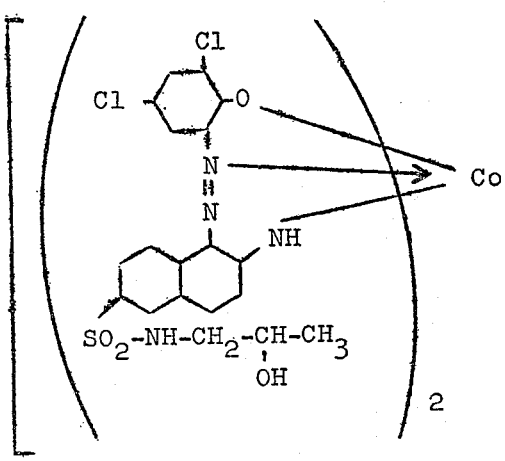

Example V

The 1:2 cobalt complex compound of the monoazo dye of the formula

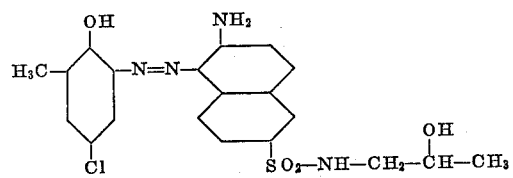

in the metal complex form

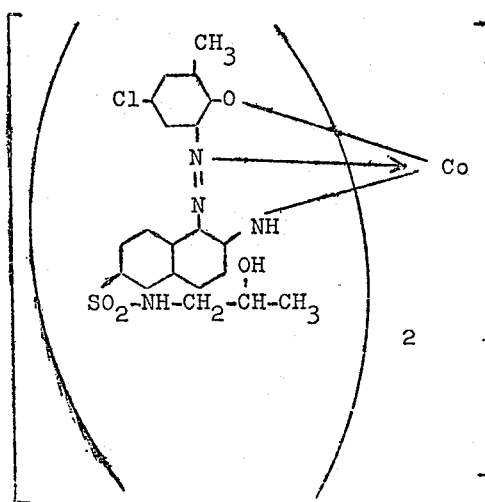

Having thus disclosed the invention what is claimed is:

1. A cobalt complex compound of monoazo dye of the formula

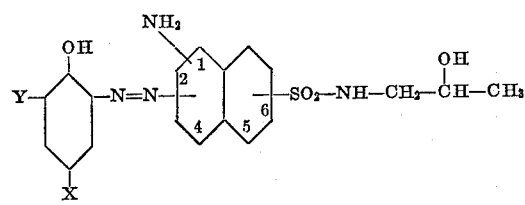

wherein X is a member selected from the group consisting of H and Cl, and Y is a member selected from the group consisting of H, CH₃ and Cl, at least one of X and Y being Cl, the NH₂ group and the —N=N— group each is in one of the positions 1 and 2 of the naphthalene moiety and the

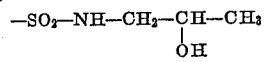

group is in one of the positions 4, 5 and 6 of the said moiety, the ratio of the number of cobalt atoms bound in complex union to the number of molecules of monoazo dye residues being substantially 1:2.

2. The 1:2 cobalt complex of the formula

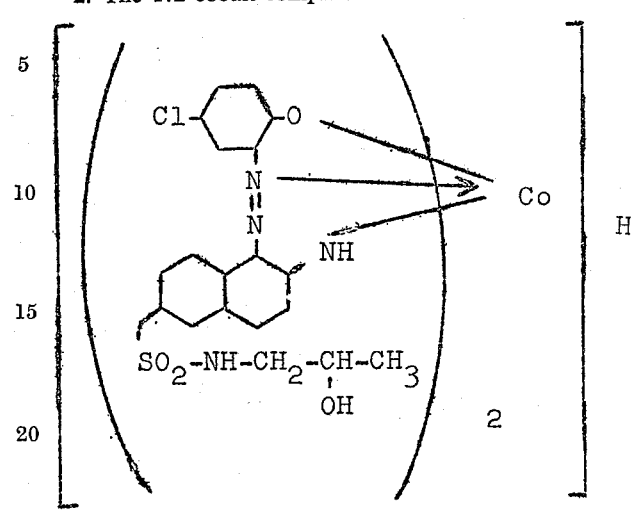

3. The 1:2 cobalt complex of the formula

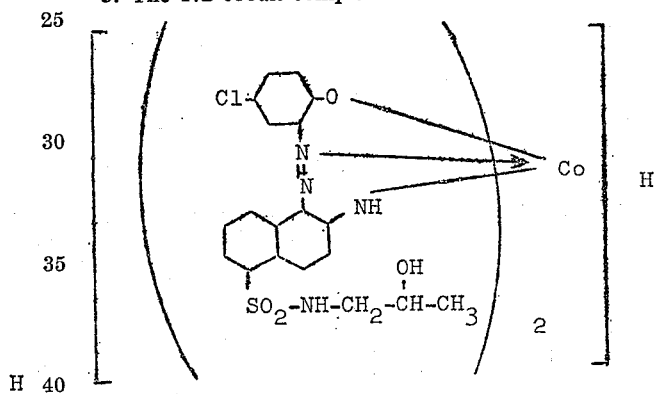

4. The 1:2 cobalt complex of the formula

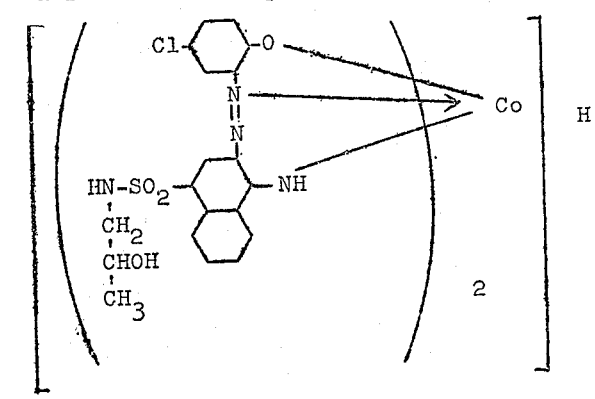

5. The 1:2 cobalt complex of the formula

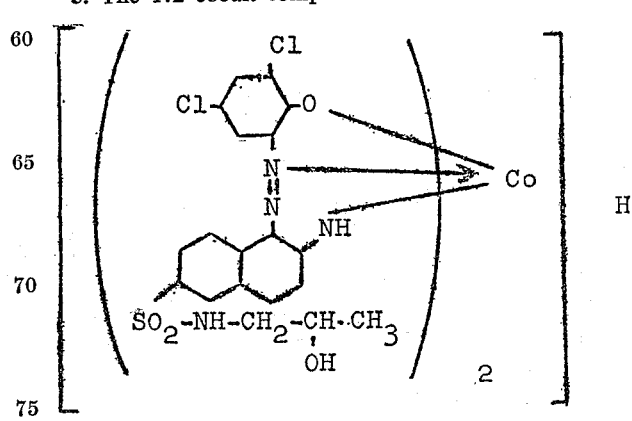

6. The 1:2 cobalt complex of the formula
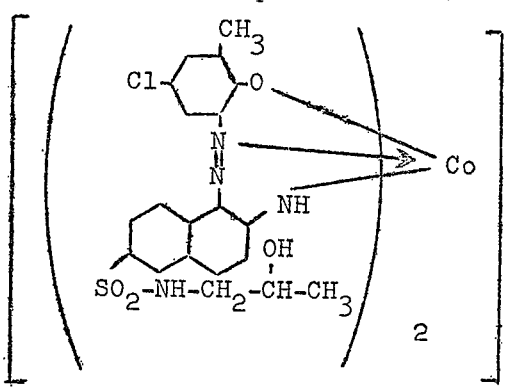
References Cited by the Examiner
UNITED STATES PATENTS
| | | | |
|---|---|---|---|
| 2,602,080 | 7/1952 | Grimmel | 260—151 |
| 2,817,657 | 12/1957 | Buehler | 260—151 |
| 2,839,520 | 6/1958 | Neier | 260—151 XR |
| 2,839,521 | 6/1958 | Schetty | 260—151 XR |
CHARLES B. PARKER, *Primary Examiner.*